(12) United States Patent
Kim et al.

(10) Patent No.: US 11,202,270 B2
(45) Date of Patent: Dec. 14, 2021

(54) METHOD AND APPARATUS FOR PERFORMING ENHANCED SYNCHRONIZATION IN WIRELESS COMMUNICATION SYSTEM

(71) Applicant: Samsung Electronics Co., Ltd., Suwon-si (KR)

(72) Inventors: Bongjin Kim, Suwon-si (KR); Daehoon Kim, Suwon-si (KR); Taekyoung Kim, Suwon-si (KR); Jongho Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/771,406

(22) PCT Filed: Dec. 13, 2018

(86) PCT No.: PCT/KR2018/015876
§ 371 (c)(1),
(2) Date: Jun. 10, 2020

(87) PCT Pub. No.: WO2019/156331
PCT Pub. Date: Aug. 15, 2019

(65) Prior Publication Data
US 2020/0351802 A1    Nov. 5, 2020

(30) Foreign Application Priority Data

Feb. 8, 2018 (KR) .................. 10-2018-0015920
Jun. 11, 2018 (KR) .................. 10-2018-0066856

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0082* (2013.01); *H04L 5/0094* (2013.01); *H04W 16/28* (2013.01); *H04W 52/0274* (2013.01)

(58) Field of Classification Search
CPC .......... H04W 56/001; H04W 56/0015; H04W 16/28; H04W 52/0274; H04L 5/0082; H04L 5/0094
See application file for complete search history.

(56) References Cited

U.S. PATENT DOCUMENTS 8,520,632 B2    8/2013 Hsu et al.
10,075,905 B2   9/2018 Kim
(Continued)

FOREIGN PATENT DOCUMENTS

JP    2002-217819 A    8/2002
JP    2010-147916 A    7/2010
(Continued)

OTHER PUBLICATIONS

Extended European Search Report dated Jan. 15, 2021, issued in European Patent Application No. 18904815.0.
(Continued)

*Primary Examiner* — Gary Mui
(74) *Attorney, Agent, or Firm* — Jefferson IP Law, LLP

(57) ABSTRACT

The present disclosure relates to a communication technique that fuses, with IoT technology, a 5G communication system for supporting higher data transmission rates than 4G systems, and a system thereof. The present disclosure can be applied to intelligent services (such as smart home, smart building, smart city, smart car, or connected car, health care, digital education, retail business, security and safety-related services, etc.) on the basis of 5G communication technology and IoT-related technology. The present disclosure relates to a method and an apparatus for performing synchronization
(Continued)

using previous synchronization information where the previous synchronization information may be information about synchronization that is lost when the terminal turns off a radio frequency module to enter a low power mode.

13 Claims, 11 Drawing Sheets

(51) Int. Cl.
*H04W 16/28* (2009.01)
*H04W 52/02* (2009.01)

(56) References Cited

U.S. PATENT DOCUMENTS

| | | | |
|---|---|---|---|
| 2004/0146030 A1* | 7/2004 | Hsieh | H04W 52/0248 |
| | | | 370/336 |
| 2005/0136882 A1* | 6/2005 | Boulton | H04B 1/7156 |
| | | | 455/343.4 |
| 2008/0279131 A1* | 11/2008 | Malladi | H04W 56/0045 |
| | | | 370/311 |
| 2011/0026464 A1 | 2/2011 | Chen et al. | |
| 2011/0223932 A1* | 9/2011 | Hole | H04W 56/0045 |
| | | | 455/456.1 |
| 2013/0064239 A1 | 3/2013 | Yu et al. | |
| 2015/0341884 A1* | 11/2015 | Das | H04W 52/0216 |
| | | | 370/311 |
| 2016/0087706 A1* | 3/2016 | Guey | H04L 5/005 |
| | | | 375/267 |
| 2016/0295532 A1 | 10/2016 | Cao et al. | |
| 2017/0264352 A1 | 9/2017 | Kohli et al. | |
| 2017/0303173 A1 | 10/2017 | Cedergren et al. | |
| 2018/0041988 A1 | 2/2018 | Lee et al. | |
| 2019/0045384 A1* | 2/2019 | Zetterberg | H04W 24/10 |

FOREIGN PATENT DOCUMENTS

| | | |
|---|---|---|
| KR | 10-2011-0111451 A | 10/2011 |
| KR | 10-2013-0028397 A | 3/2013 |
| KR | 10-2016-0004751 A | 1/2016 |
| WO | 2016/182228 A1 | 11/2016 |

OTHER PUBLICATIONS

Korean Office Action dated Jul. 16, 2021, issued in Korean Patent Application No. 10-2018-0066856.

* cited by examiner

METHOD AND APPARATUS FOR PERFORMING ENHANCED SYNCHRONIZATION IN WIRELESS COMMUNICATION SYSTEM

TECHNICAL FIELD

The disclosure relates to 5G wireless communication (or, next generation wireless communication). More particularly, the disclosure relates to a procedure for a terminal to perform synchronization in a wireless communication system.

BACKGROUND ART

To meet the ever increasing demand for wireless data traffic since the commercial deployment of 4G communication systems, efforts have been made to develop improved 5G or pre-5G communication systems. As such, 5G or pre-5G communication systems are also called "beyond 4G network system" or "post LTE system".

To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), interference cancellation, and the like.

Additionally, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various fields, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine (M2M) or machine type communication (MTC) are being realized by use of 5G communication technologies including beamforming, MIMO, and array antennas. Application of cloud RANs as big data processing described above may be an instance of convergence of 5G technology and IoT technology.

Meanwhile, it is important for a terminal to perform low power operation because it uses a battery, and as the power consumption of a radio frequency (RF) chain (or, RF module) is high particularly in the 5G communication system described above, minimization of power consumption is required.

DISCLOSURE OF INVENTION

Technical Problem

The disclosure is to reduce power consumption of a terminal in a synchronization procedure by which the terminal acquires synchronization to return from a low power mode set for reducing power consumption.

The technical objectives to be achieved in the disclosure are not limited to those described above, and other technical problems not mentioned may be considered by those skilled in the art from embodiments of the disclosure to be described below.

Solution to Problem

To solve the above problem, according to an embodiment of the disclosure, a method for a terminal includes: identifying, by the terminal, previous synchronization information; and performing synchronization with a base station by using the previous synchronization information.

According to another embodiment of the disclosure, the previous synchronization information may be information related to at least one of frequency synchronization acquisition, time synchronization acquisition, or beam search; and the previous synchronization information may be information about synchronization that is lost when the terminal turns off a radio frequency (RF) module to enter a low power mode.

According to another embodiment of the disclosure, the information related to frequency synchronization acquisition in the previous synchronization information includes information about a position on a frequency axis of a synchronization signal received through the lost synchronization, information about a subcarrier spacing, and information about a value compensating for a carrier frequency error; and performing synchronization may obtain frequency synchronization with the base station by applying the information about the position, the information about the subcarrier spacing, and the value.

According to another embodiment of the disclosure, the information related to time synchronization acquisition in the previous synchronization information includes information about a length of a time interval measured by a different RF module, information about a period in which a synchronization signal is transmitted, and information about a time offset for the lost synchronization; and performing synchronization may obtain time synchronization with the base station by identifying a boundary of a time interval from the information about the length of the time interval, the information about the period, and the information about the time offset.

According to another embodiment of the disclosure, the information related to beam search in the previous synchronization information includes information about a beam transmission period of a base station and information about a reception beam last used by the terminal; and performing synchronization may perform synchronization with the base station by using the last used reception beam while changing reception beams of the terminal for each beam transmission period.

According to another embodiment of the disclosure, the information related to beam search in the previous synchronization information includes information about a synchronization block transmission period of a base station and a synchronization block transmission frequency position; and performing synchronization may perform synchronization with the base station by monitoring the synchronization block transmission frequency position while changing reception beams of the terminal for each synchronization block transmission period.

According to another embodiment of the disclosure, synchronization using the previous synchronization information, monitoring of a synchronization signal based on at least one of time resources, frequency resources, or reception beams may be omitted according to the previous synchronization information.

According to another embodiment of the disclosure, the base station to which the previous synchronization information is related may be identical to the base station with which synchronization is performed.

According to another embodiment of the disclosure, the method may further include determining whether to use the previous synchronization information while performing synchronization; synchronization may be performed based on the previous synchronization information in case of being determined to use the previous synchronization information; and synchronization may be performed without consideration of the previous synchronization information in case of being determined not to use the previous synchronization information.

According to another embodiment of the disclosure, determining whether to use the previous synchronization information may be determined based on the mobility of the terminal while operating in the low power mode; and in case that the mobility of the terminal is lower than a threshold, it may be determined to use the previous synchronization information.

According to another embodiment of the disclosure, in case that synchronization performed using the previous synchronization information fails, the terminal may perform synchronization again without consideration of the previous synchronization information.

To solve the above problem, according to another embodiment of the disclosure, a terminal includes: a transceiver to transmit and receive signals; and a controller configured to identify, by the terminal operating in a low power mode, stored previous synchronization information, and perform synchronization with a base station by using the previous synchronization information.

Advantageous Effects of Invention

According to an embodiment of the disclosure, the time required for the terminal to perform the synchronization procedure can be shortened efficiently. As the synchronization procedure can be performed in a simplified way, the terminal can actively operate the low power mode, increasing the life of the battery thereof.

In addition, whenever high-speed data communication is needed in a 5G communication system, the delay time required to start communication is reduced, so that user experience can be improved.

MODE FOR THE INVENTION

Figure 1:
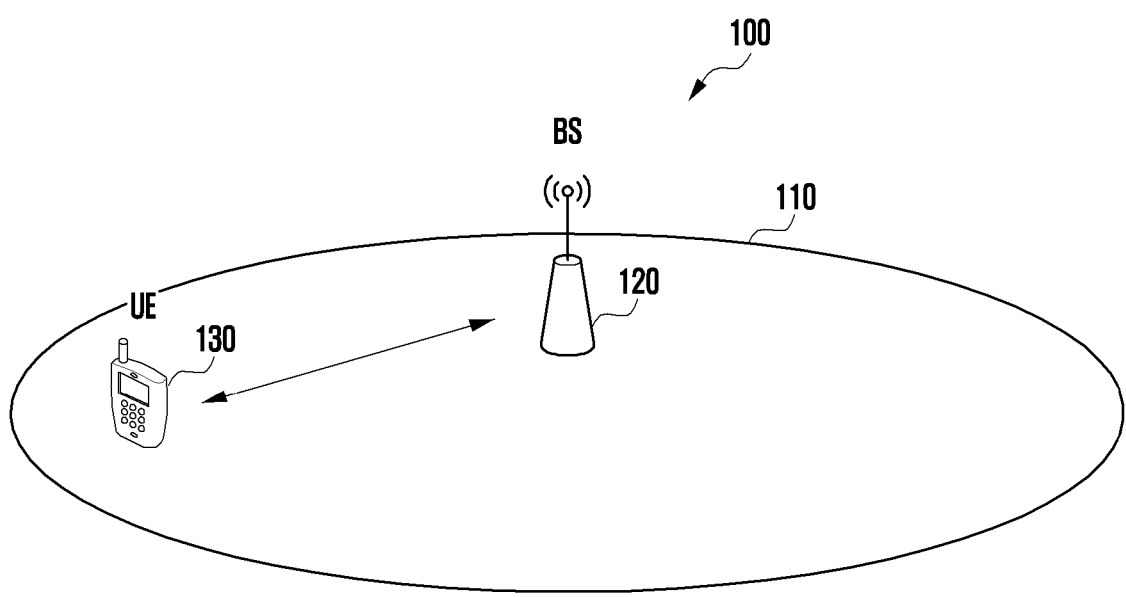
FIG. 1 is a diagram illustrating a synchronization procedure performed in a communication system.

Hereinafter, preferred embodiments of the disclosure are described in detail with reference to the accompanying drawings. It should be noted that the same or similar reference symbols are used throughout the drawings to refer to the same or like parts. Descriptions of well-known functions and constructions may be omitted to avoid obscuring the subject matter of the disclosure.

In the following description of embodiments of the disclosure, descriptions of technical details well known in the art and not directly related to the disclosure may be omitted. This is to more clearly convey the gist of the disclosure without obscurities by omitting unnecessary descriptions.

Likewise, in the drawings, some elements are exaggerated, omitted, or only outlined in brief. Also, the size of each element does not necessarily reflect the actual size. In the drawings, the same reference symbols are used to refer to the same or corresponding parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card.

FIG. 1 is a diagram 100 illustrating a synchronization procedure performed in a communication system.

For a terminal 130 to communicate with a base station 120, the terminal 130 must access a cell 110 provided by the base station 120. The first process in which the terminal 130 accesses the cell 110 is a synchronization procedure, and is performed by a process in which the terminal 130 receives a synchronization signal transmitted by the base station 120 and synchronizes with the base station 120.

In performing this synchronization procedure, the terminal 130 initially does not have any information about the base station 120. Hence, the terminal 130 may receive a synchronization signal such as a primary synchronization signal (PSS), a secondary synchronization signal (SSS), or physical broadcast channel (PBCH) transmitted by the base station 120 to obtain synchronization (i.e., being synchronized) with the base station 120, and after synchronization is obtained, the terminal 130 may transmit a signal to the base station 120 or receive a signal from the base station 120.

Meanwhile, recently, to solve the frequency shortage problem, wireless communication using a high frequency band has been developed in 5G communication systems. However, in the case of high-frequency wireless communication, excessive pathloss occurs, so beamforming is required to improve transmission and reception performance. In such a case of wireless communication using a high frequency band, power consumption is very large due to beamforming, and thus, the terminal operates in a low power mode to minimize power consumption unless high speed communication is required. For example, it is required for the terminal to cut off the power of the RF module (or, RF chain) for 5G communication requiring more power consumption compared with the LTE/LTE-A communication system.

When considering characteristics of the 5G communication system to which beamforming is applied, the synchronization procedure should be performed in consideration of both transmission beams of the base station and reception beams of the terminal. As the number of transmission beams of the base station and the number of reception beams of the terminal increases, time and power consumption required for the synchronization procedure increase, so applying a general synchronization procedure as it is can be a significant burden from the perspective of the terminal and the base station.

Specifically, for the terminal to synchronize with the base station, a beam search, acquisition of frequency synchronization, and acquisition of time synchronization are required. The beam search is a process of finding a beam that can best receive a beam of the base station among the beams managed by the terminal, and it takes a time equal to the beam transmission period of the base station to measure all the transmission beams of the base station for one reception beam of the terminal. Frequency synchronization acquisition is a process in which the terminal reduces the difference between carrier frequencies (or, carrier frequency offset (CFO)) with the base station, where a correction process reflecting measurement and result values is repeatedly performed. Time synchronization acquisition is a process obtained by decoding a packet containing time information of the base station. In the synchronization procedure of the terminal, the beam search and frequency synchronization in particular occupy a large portion in terms of time.

Accordingly, hereinafter, a description is given of embodiments for improving the synchronization procedure, and in particular, a synchronization procedure that can be applied in a communication system to which beamforming is applied as described above will be described.

FIGS. 2 to 7 are diagrams 200, 300, 400, 500, 600 and 700 illustrating a synchronization method according to an embodiment of the disclosure. Before describing FIGS. 2 to 7 in detail, an overall description is given of the proposed embodiment.

As described above, the synchronization procedure may include three processes such as beam search, frequency synchronization acquisition, and time synchronization acquisition. Next, it is proposed to utilize information existing before the terminal turns off the RF power for 5G communication, that is, information before the previous synchronization maintained with the base station is lost, in the new synchronization procedure. Specifically, the terminal may apply information related to previous synchronization before being lost (hereinafter, referred to as previous synchronization information) respectively to beam search, frequency synchronization acquisition, and time synchronization acquisition in the new synchronization process, in which case the time and burden required for the new synchronization process can be reduced and a fast and simplified synchronization procedure can be performed. Such an embodiment may be understood as a synchronization re-acquisition process in that the previous synchronization information is used for the process of obtaining new synchronization.

Figure 2:
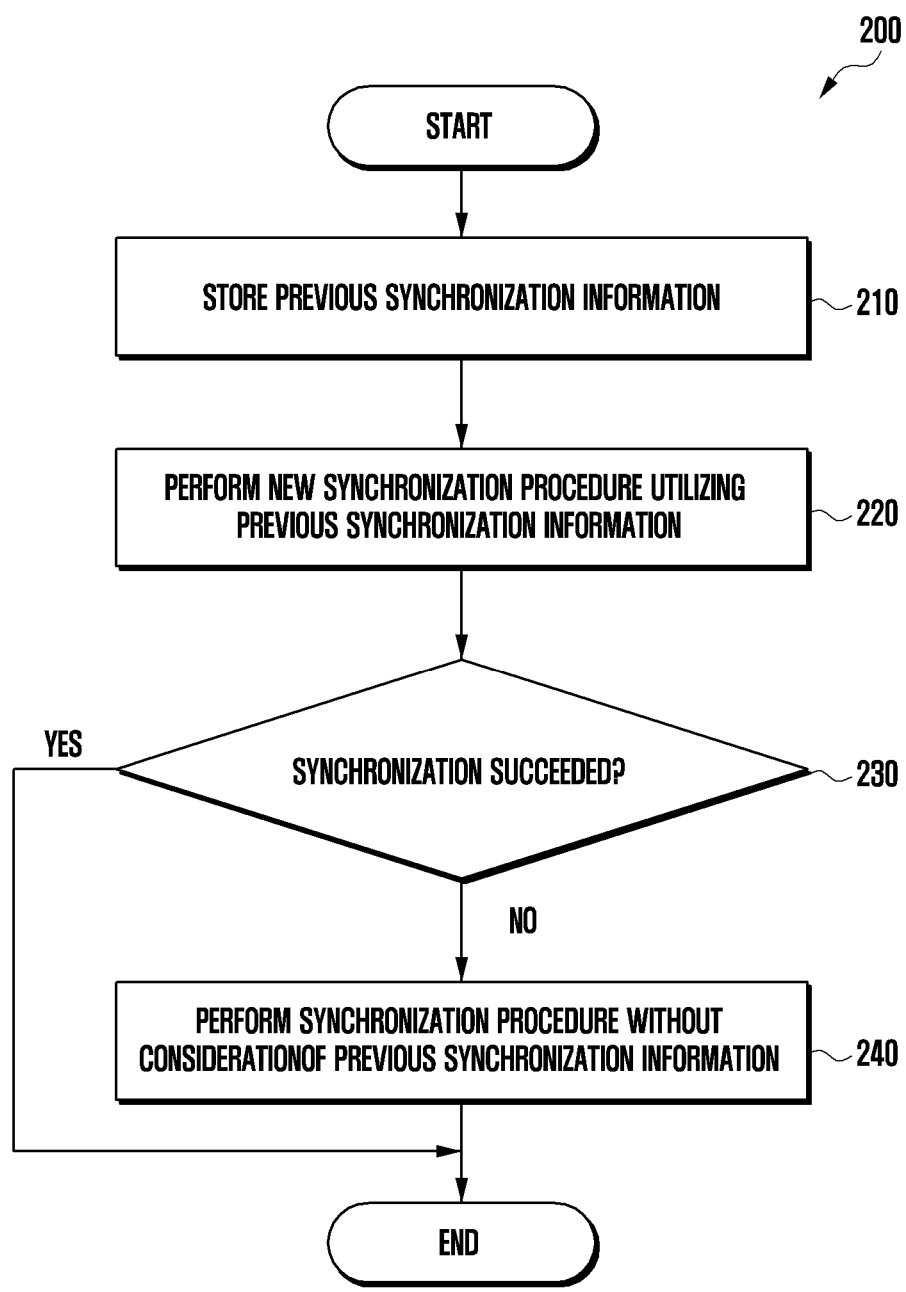
FIG. 2 is a diagram illustrating a synchronization method according to an embodiment of the disclosure.

FIG. 2 is a diagram 200 illustrating a synchronization method according to an embodiment of the disclosure. First, the terminal that maintains synchronization with the 5G base station for communication stores information related to synchronization acquired for the 5G base station (i.e., previous synchronization information) when turning off the RF module for the 5G communication system (210). The related information (or, previous synchronization information) is information received through a radio resource control (RRC) connection between the terminal and the 5G base station, and may include various information or parameters such as SSB-transmitted, SSB-periodicity-serving-cell, and half-frame-index in addition to, for example, SSB-scs (synch signal PBCH block—subcarrier spacing) for determining the subcarrier space between individual carriers. Meanwhile, the subcarrier space applied in the 5G communication system may be determined to be 15 kHz or 30 kHz (<6 GHz), and 120 kHz and 240 kHz (>6 GHz). Although the above process for storing previous synchronization information may be performed simultaneously with turning off the 5G RF module, the terminal may also store the previous synchronization information before turning off the 5G RF module. After turning off the 5G RF module, the terminal continues to store the previous synchronization information and retains the same.

Thereafter, when the terminal is in a situation of performing new synchronization with a 5G base station, the terminal checks the stored previous synchronization information and utilizes the same to perform a new synchronization procedure (220). The detailed process in which the terminal utilizes the previous synchronization information will be described in detail with reference to FIGS. 3 and 4 below. For the terminal to perform a new synchronization procedure by using the previous synchronization information, the previous synchronization information owned by the terminal must also be applicable to the base station with which the new synchronization will be performed. In other words, in the case of a stationary terminal with little or no mobility, the terminal may utilize the previous synchronization information in a same or similar manner when performing synchronization again after disconnecting a connection with the base station.

If the terminal successfully acquires synchronization as a result of performing the simplified (or, restricted) synchronization procedure using the previous synchronization information (230), the terminal ends the synchronization procedure. On the other hand, the terminal may fail to acquire synchronization as a result of performing the simplified synchronization procedure using the previous synchronization information (230). Such a situation may occur for various reasons, such as a case where the target base station to newly acquire synchronization is changed owing to movement of the terminal, and a case where the condition of a specific beam among the transmission beams of the base station or the reception beams of the terminal is not good.

When the terminal fails to acquire synchronization using the previous synchronization information, it newly performs a synchronization procedure without consideration of the previous synchronization information (240). In other words, the terminal determines that the previous synchronization information is not valid and performs a synchronization procedure with the base station according to the general synchronization procedure. Because the terminal performs synchronization by detecting a signal with a preset strength or higher from the base station while sweeping the reception beams, if the terminal has failed to acquire synchronization using the previous synchronization information, it may mean that the terminal has failed to detect a signal from the base station for all reception beams.

Figure 3:
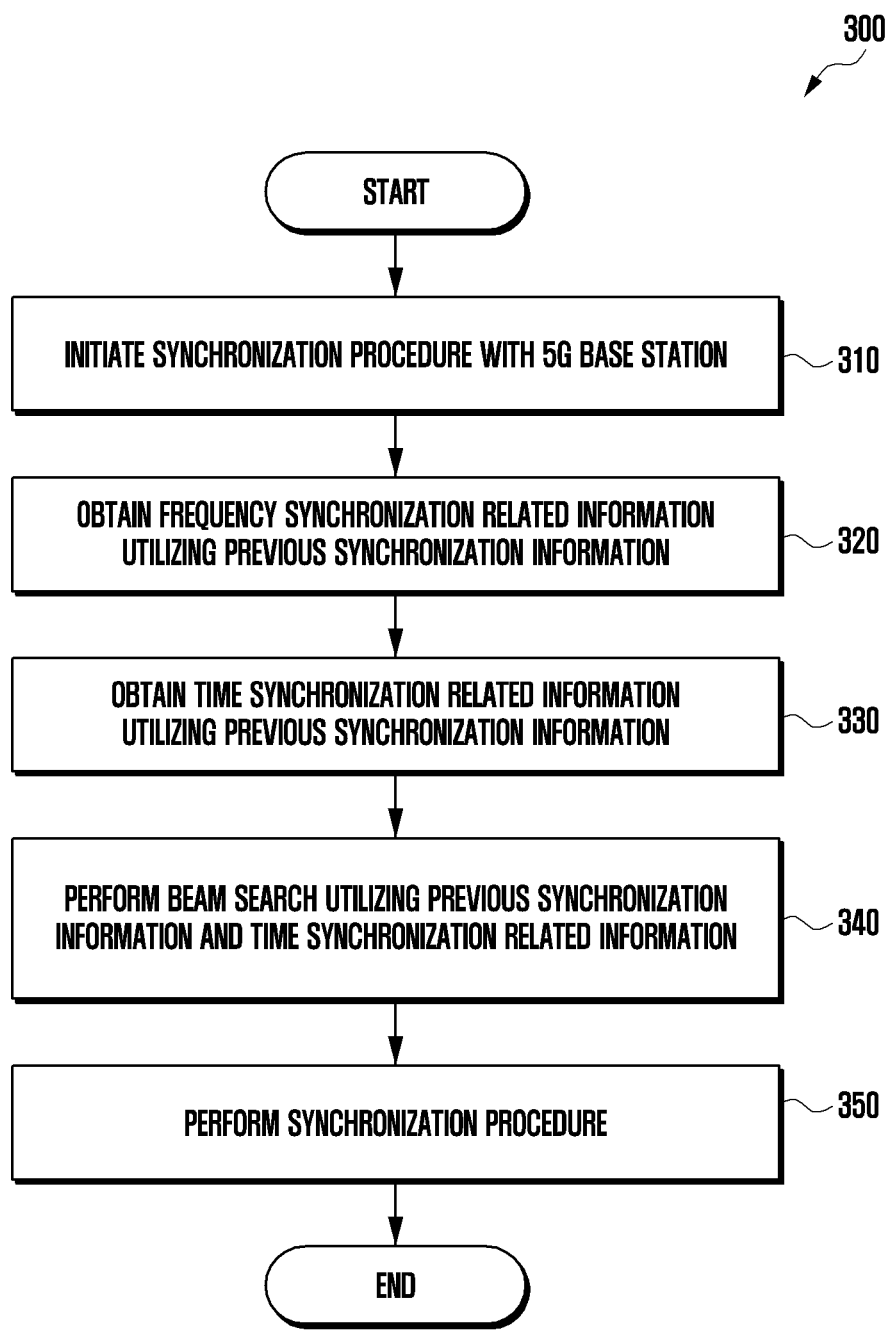
FIG. 3 is a diagram illustrating a synchronization method according to another embodiment of the disclosure.
Figure 4:
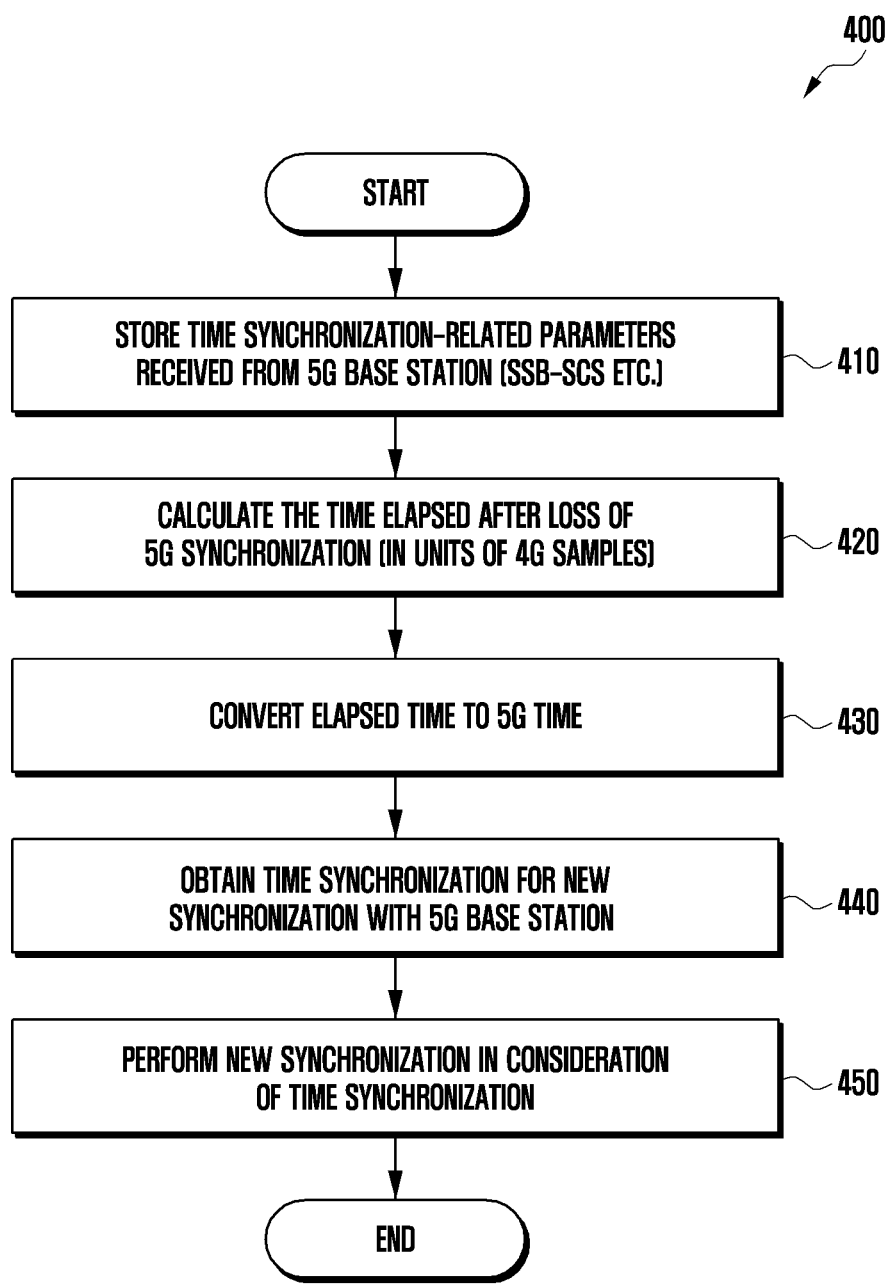
FIG. 4 is a diagram describing a detailed process for obtaining time synchronization according to an embodiment of the disclosure.

FIG. 3 is a diagram 300 illustrating a synchronization method according to another embodiment of the disclosure. In FIG. 3, a specific process of using the previous synchronization information described in FIG. 2 will be described, and the procedure of FIG. 3 may be understood as a detailed description of step 220 of FIG. 2.

As described above, in a communication system to which beamforming is applied, the synchronization procedure between the terminal and the base station may include beam search, frequency synchronization acquisition, and time synchronization acquisition. In FIG. 3, a description is given of a method in which the terminal initiates a synchronization procedure with a 5G base station to establish a new connection with the 5G base station (310) and utilizes previous synchronization information in each process of frequency synchronization acquisition, time synchronization acquisition, and beam search.

First, a description is given of a process of obtaining frequency synchronization between the terminal and the base station. In a 5G communication system, the position on the system bandwidth where a synchronization signal (or, SSB including SS and PBCH) is transmitted may vary. That is, as the synchronization signal (SSB) can be transmitted even at a position other than the center of the system band, the terminal may have to directly search for and find the position on the frequency axis at which a synchronization signal is transmitted in some cases. In this case, the terminal may store the period in which the base station transmits a synchronization block and the block position in the frequency band in an initial synchronization process, and thereafter may apply it to a new synchronization process to thereby reduce the time required for the synchronization acquisition process. For example, the terminal may store the information received through the latest radio resource control (RRC) connection established with the 5G base station before 5G synchronization is lost as previous synchronization information and may utilize it as frequency synchronization information in the new synchronization procedure.

In addition, the carrier frequency error (CFO) between the terminal and the base station occurs due to hardware characteristics, and the terminal compensates for the carrier frequency error during a synchronization process with the base station. If the terminal has calculated the final value for compensating for the carrier frequency error in the process of synchronizing with the base station, the terminal may utilize the previous calculation result without having to measure the compensation value again for synchronization for the same base station. Hence, the terminal may store the carrier frequency error value before turning off the 5G RF module and operating in the low power mode and may use it in a new synchronization procedure. In other words, the terminal may store the stored carrier frequency error value as the previous synchronization information, and may apply it directly to the process of measuring the carrier frequency error in the new synchronization procedure, omitting the error measurement process.

In summary, the terminal may store at least one of information about the position on the frequency axis where a synchronization signal is transmitted or information about the carrier frequency error before the synchronization with the 5G base station is lost as the previous synchronization information, and may utilize it as frequency synchronization related information in the process of performing new synchronization with the 5G base station (320).

Next, a description is given of the process of obtaining time synchronization between the terminal and the base station. The terminal performing new synchronization with the 5G base station may obtain information related to time synchronization by using the previous synchronization information (330). A detailed process for the terminal to obtain time synchronization-related information to be used for 5G synchronization from the previous synchronization information described above is described in detail with reference to FIG. 4.

For the terminal to achieve time synchronization with the base station, the terminal has to check the frame by using a synchronization signal of the base station and identify the frame number through packet decoding. If the terminal can know how much time has elapsed during the time of operation in the low power mode after turning off the 5G RF module, the terminal can reduce the process of acquiring time synchronization in the new synchronization procedure.

First, the terminal stores time synchronization-related parameters received from the 5G base station before turning off the 5G RF module and losing synchronization with the 5G base station (410). These time synchronization-related parameters may be various parameters or information such as SSB-scs, SSB-index-explicit, UL-frequency-shift-7p5khz, SSB-transmitted, SSB-periodicity-serving-cell, and half-frame-index, which are described above as examples of the previous synchronization information. In particular, in a 5G communication system, the OFDM symbol length and subcarrier spacing can be varied to have one of several values, and thus the SSB-scs parameter may be interpreted as a value corresponding to information about the length of an OFDM symbol and, moreover, the length of a slot or a subframe.

Then, even if the 5G RF module is turned off, as the terminal may continuously drive another RF module (e.g., RF module for LTE/LTE-A communication), the terminal may calculate how long the 5G RF module has been turned off through the another RF module and derive time information for the new synchronization process from the calculation result.

Specifically, when one subframe of the 5G communication system is 30720 samples and 0.2 ms, and one subframe of the LTE communication system is 30720 samples and 1 ms, the sampling time of 5G is 5 times shorter than that of LTE. Hence, while the 5G RF module is turned on, the terminal may store how the sample times of the 5G communication system and the LTE communication system correspond to each other. In other words, the terminal may store in advance the correspondence between the length or interval of the 5G sample time (subframe, transmission time interval (TTI), slot, OFDM symbol length, etc.) and that of the LTE sample time in terms of ratio or value.

Subsequently, the terminal may identify synchronization time information of the LTE/LTE-A communication system corresponding to the time when the 5G RF module is turned off, and may calculate the time when new synchronization is performed in terms of the number of frames (or, subframes, TTIs, samples) of the LTE/LTE-A system that has passed from the identified previous synchronization time information (420). That is, the terminal may calculate the time elapsed after 5G synchronization is lost in units of samples of the 4G (LTE) system. After this calculation process, the terminal may convert the time in units of 4G samples to the 5G time by reflecting the stored correspondence (e.g., 5 times) (430), and the terminal may calculate how much time has elapsed with respect to the 5G system when the 5G synchronization procedure is performed (440). The terminal having calculated the time synchronization for the 5G communication system may utilize the calculated result when performing synchronization for the 5G communication system (450), reducing the time required for the process to newly achieve time synchronization.

Namely, in the case of a terminal operating in a 5G communication system where the length of a subframe or slot may have one of several values, the terminal may calculate the relative length information of the LTE subframe in comparison to the length of the configured 5G subframe or slot and apply it to a process of time synchronization calculation in the new 5G synchronization procedure. For example, the terminal may set or utilize synchronization-related information received through the most recently established radio resource control (RRC) connection with the base station in the 5G time synchronization calculation process. The received information may include a value or parameter set through higher layer signaling such as at least SSB-scs.

Meanwhile, a 5G base station operating in a 5G system transmits a synchronization signal (or, SSB) within a 5-ms window while changing transmission beams. A plurality of synchronization signals are transmitted through different beams, and the terminal may determine that the SSB is transmitted every period of SS-periodicity (eg, 20 ms) when viewed based on a specific beam. Consequently, even if the time elapsed after synchronization with the 5G base station is lost can be calculated as described above by using the previous synchronization information (time in units of 5G samples), the corresponding time point may be different from the time point when the synchronization signal (SSB) of the 5G system is transmitted. Hence, the terminal may store and use information on the time difference (or, offset) from the time when the synchronization signal (SSB) was last received before the loss of synchronization to the time when 5G synchronization is lost as supplementary information. The information on the time difference may be stored as a preset value, and can be considered together after calculating the time for synchronization with the 5G base station using the 4G sample time. Through this embodiment, the terminal can accurately calculate the time point when the SSB transmitted from the 5G system is received.

Further, the terminal may periodically update and store information on the time correspondence between the 5G communication system and the LTE communication system while the RF module is turned on, or may update and store the same information aperiodically when a preset condition is satisfied or triggered. In this calculation process, the terminal may calculate the frame/subframe number and boundary of the 5G communication system by utilizing the sample clock counter for the LTE/LTE-A system, and information about time synchronization for new synchronization may be derived from the calculation result. Because the clock counter value is a value representing a length of absolute time, it may be utilized as a value indicating the difference (i.e., offset) between the last reception time of the synchronization signal and the time when 5G synchronization is lost described above.

Finally, a description is given of the beam search process between the terminal and the base station. The terminal performing new synchronization with the 5G base station may perform a beam search procedure by using the previous synchronization information and the time synchronization information described in FIGS. 3 and 4 (340). As described above, a detailed process for the terminal to perform the beam search procedure using the previous synchronization information will be described in detail with reference to FIG. 5.

The beam transmission period of the base station varies depending on the number of transmission beams operated by the base station, and the terminal can know the beam transmission period of the base station by decoding packets transmitted from the base station after obtaining synchronization. Hence, the terminal should perform measurement by assuming the maximum value of the beam transmission period in the beam search stage during the synchronization process, which is one of the reasons that the synchronization process takes a lot of time. Meanwhile, if the terminal can know or estimate the beam transmission period of the base station in the process of synchronizing with the 5G base station and performing communication, it can minimize the waste of radio resources and power required for the new synchronization procedure performed for the corresponding 5G base station.

Figure 5:
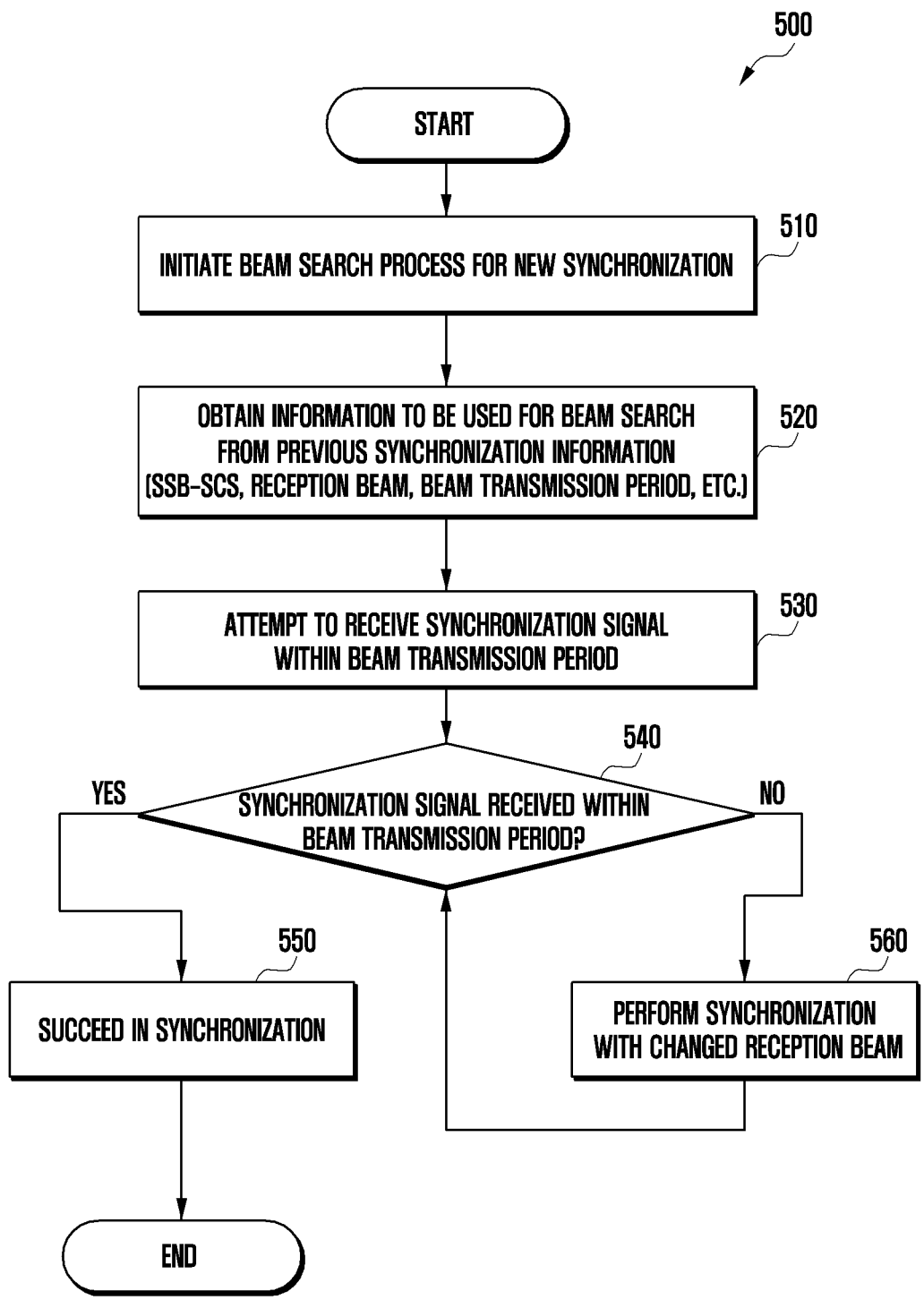
FIG. 5 is a diagram describing a detailed process for beam search according to an embodiment of the disclosure.

For example with reference to FIG. 5, the terminal performing new synchronization with a 5G base station initiates a beam search process (510), and the terminal may store information that can be used in the beam search process with the 5G base station (e.g., SSB-scs, reception beam, beam transmission period (or, number of transmission beams), etc.) as the previous synchronization information and then utilize it in the beam search process (520). The terminal may use and apply the previous synchronization information to a process of receiving a synchronization signal from the base station in a new synchronization procedure, thereby reducing the time required and the power consumed for the synchronization acquisition process.

As an example as to the reception beam, if the terminal is a stationary terminal without movement, the terminal will have a high probability of success in obtaining synchronization by reusing the reception beam that has been last used without having to search for all beams in the beam search process. Accordingly, the terminal may store information on the last used beam as previous synchronization information, and perform beam search by setting the last used beam as the reception beam in a new synchronization process.

When the terminal performs a beam search process by setting the last used beam (i.e., previous synchronization terminal beam) as the reception beam, the terminal may perform beam search by applying the stored base station information. For example, the terminal may store at least one piece of information that can be used for beam search, such as stored SSB-scs information, information about the beam transmission period of the base station, the offset from the time point at which 5G synchronization was lost, and information about whether the base station transmits a synchronization beam, and then apply it to the beam search process.

Meanwhile, the terminal attempts to receive a synchronization signal (SSB) from the 5G base station within the beam transmission period (period and offset stored in the previous synchronization information) through the beam search process described above using a specific reception beam (e.g., last used beam) (530). If a synchronization signal is received within the beam transmission period (540), the terminal decodes the synchronization signal to perform the synchronization procedure, and the terminal that has been successfully synchronized (550) may terminate the synchronization procedure and perform communication with the base station. On the other hand, although the beam search process using the last used beam has been performed during the beam transmission period of the base station, if a synchronization signal is not received with sufficient strength from the base station or the terminal cannot decode the synchronization signal (540), that is, if synchronization fails, the terminal changes the reception beam and performs synchronization with the base station (560). At this time, the terminal may perform the beam search process while sequentially changing the reception beams (sweeping) according to a preset order, but the terminal may also preferentially select a beam that is spatially adjacent to the last used beam and perform the beam search process. As the terminal can collect location information and movement information by using an embedded sensor (e.g., GPS sensor, gyroscope sensor, etc.), the terminal may detect changes in the location of the terminal or the direction of the antenna and determine a reception beam to be preferentially selected if the beam search using the last used beam fails in the new synchronization process. The terminal performs a beam search process for detecting a signal from the base station in sequence for all beams, and finally determines that the beam search process has failed if the terminal has failed to receive a signal from the base stations for all the beams.

As described above, the terminal can reduce the time required or the power consumed for beam search in a new synchronization procedure by storing the previous synchronization information and using it in a new 5G synchronization procedure. This procedure may be called a simplified beam search process or a restricted beam search process, and detailed operations of the terminal performing a simplified (or, restricted) beam search process will be described with reference to FIG. 6 below.

Figure 6:
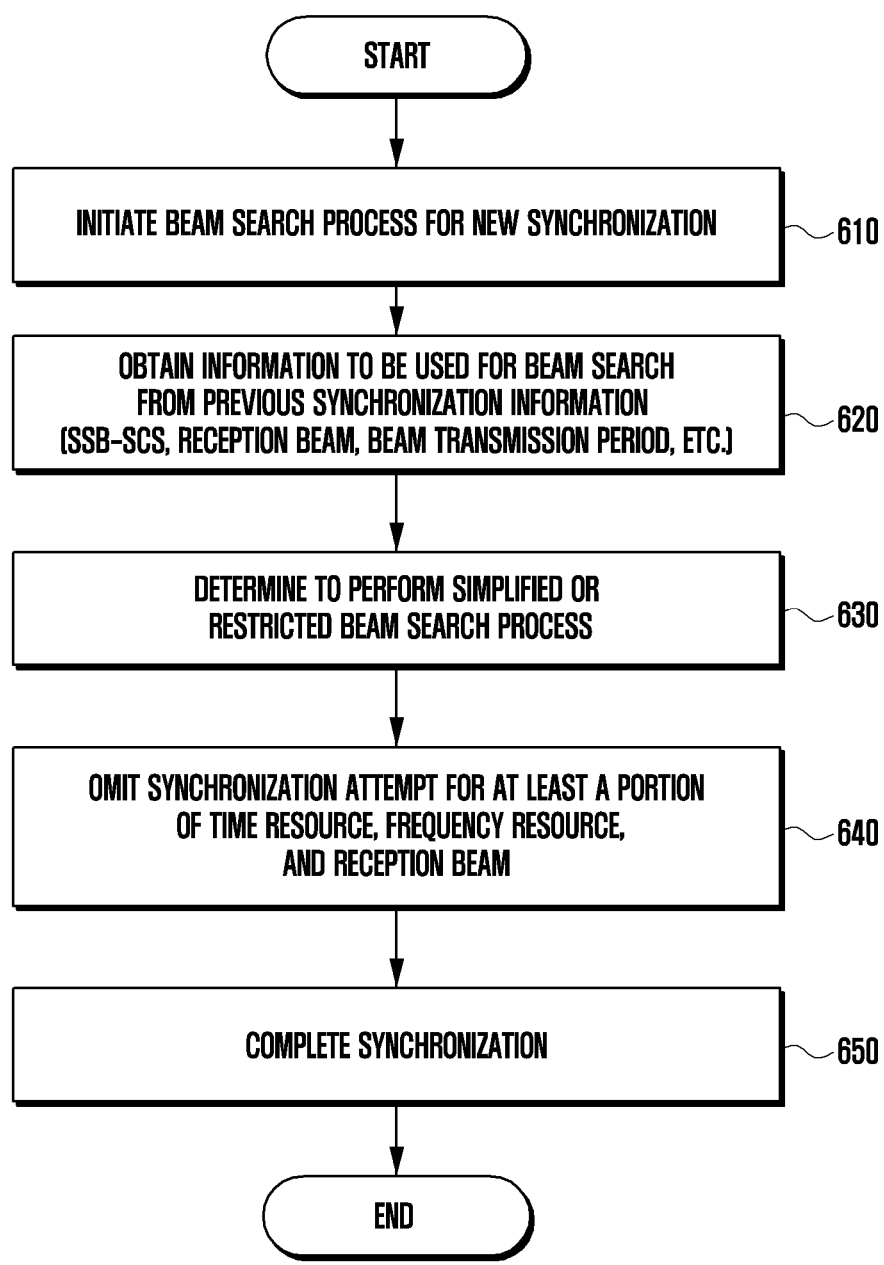
FIG. 6 is a diagram describing a detailed process for restricted beam search according to an embodiment of the disclosure.

The process of initiating the beam search process and obtaining information to be used for beam search from the previous synchronization information in FIG. 6 has been described in detail with reference to FIG. 5, and a detailed description thereof is omitted. Thereafter, the terminal determines to perform a restricted beam search process (630). Upon determining that the information obtained from the previous synchronization information is sufficient to perform new 5G synchronization, the terminal may determine to perform a restricted beam search.

For example, when the terminal has obtained information on SBS-scs from the previous synchronization information, based on SSB-scs (Synch Signal PBCH Block-subcarrier spacing) being a parameter determining the subcarrier space between individual subcarriers, the terminal may determine the subcarrier space for monitoring the synchronization signal to be 15 kHz or 30 kHz (<6 GHz), or 120 kHz and 240 kHz (>6 GHz) and apply it. Using this information, the terminal may perform a beam search procedure by attempting to synchronize only with a practical SCS instead of attempting to synchronize with all possible SCSs.

As another embodiment, when the terminal obtains information on SSB-periodicity-serving-cell from the previous synchronization information, the terminal may identify the period at which the synchronization signal is transmitted by using the corresponding parameter and use the period in the synchronization procedure. The terminal may utilize this information to perform the beam search procedure by waiting only the minimum time required to select the optimal beam from the synchronization signal. In this process, as described above, the terminal may also use the information related to the offset from the last reception of the synchronization signal to the loss of the 5G synchronization together.

As another embodiment, when the terminal obtains information on SSB-transmitted from the previous synchronization information, the terminal may determine that the resources corresponding to the SSB (including SS and PBCH) do not overlap other signals or channels by using the corresponding parameter. Alternatively, when the terminal obtain information on a position on the frequency axis at which a synchronization signal is transmitted from the previous synchronization information, the terminal may determine the position on the frequency axis at which the synchronization signal is preferentially monitored from the corresponding information.

As another embodiment, when the terminal obtains information about half-frame-index from the previous synchronization information, the terminal may check whether the synchronization signal is present in the first 5 ms or the second 5 ms within the radio frame by using the corresponding parameter and use the result in the process of monitoring the synchronization signal. The terminal may omit the beam search process (i.e., synchronization attempt) for at least a portion of the time resource, the frequency resource, and the reception beam by utilizing one or more of the various pieces of information described above (640). Accordingly, the terminal can successfully complete synchronization while effectively reducing power consumption by reducing unconditional SSB decoding attempts to monitor the synchronization signal over all radio resources using all reception beams (650).

The embodiments described above may be understood as follows. That is, in 5G Non Stand Alone (NSA) mode where 5G communication is dependent on 4G, the base station may transmit a 5G communication control signal to a terminal through the 4G communication system. According to an embodiment, the base station may transmit a control signal to stop 5G communication of the terminal through the 4G network, and then transmit a control signal to resume 5G communication according to conditions. In this case, the terminal may store the period in which the base station transmits the synchronization block and the block position in the frequency band in the process of initial synchronization with the 5G network, and then apply this in a new synchronization process that is started when the control signal for resuming 5G communication is received from the 4G base station, thereby reducing the time required for the synchronization acquisition process. In addition, the base station may deliver the RRC information described above to the terminal resuming 5G communication through the 4G network. In other words, the above-described embodiment may be applied not only to a synchronization procedure between a regular terminal and a 5G base station but also to the NSA mode or EN-DC (E-UTRAN NR dual connectivity) scenario where a connection is made to a 5G communication network through a 4G base station.

According to the embodiments described above, the terminal performs a new synchronization procedure with the base station by performing beam search, time synchronization acquisition, and frequency synchronization acquisition utilizing the previous synchronization information (350). Meanwhile, in FIG. 3, steps 320, 330 and 340 are listed in a preset order for ease of description, and the corresponding processes may be performed in a different order in the synchronization procedure. For example, the terminal may first select a beam to be used for beam search and obtain frequency synchronization and time synchronization by using the beam.

Figure 7:
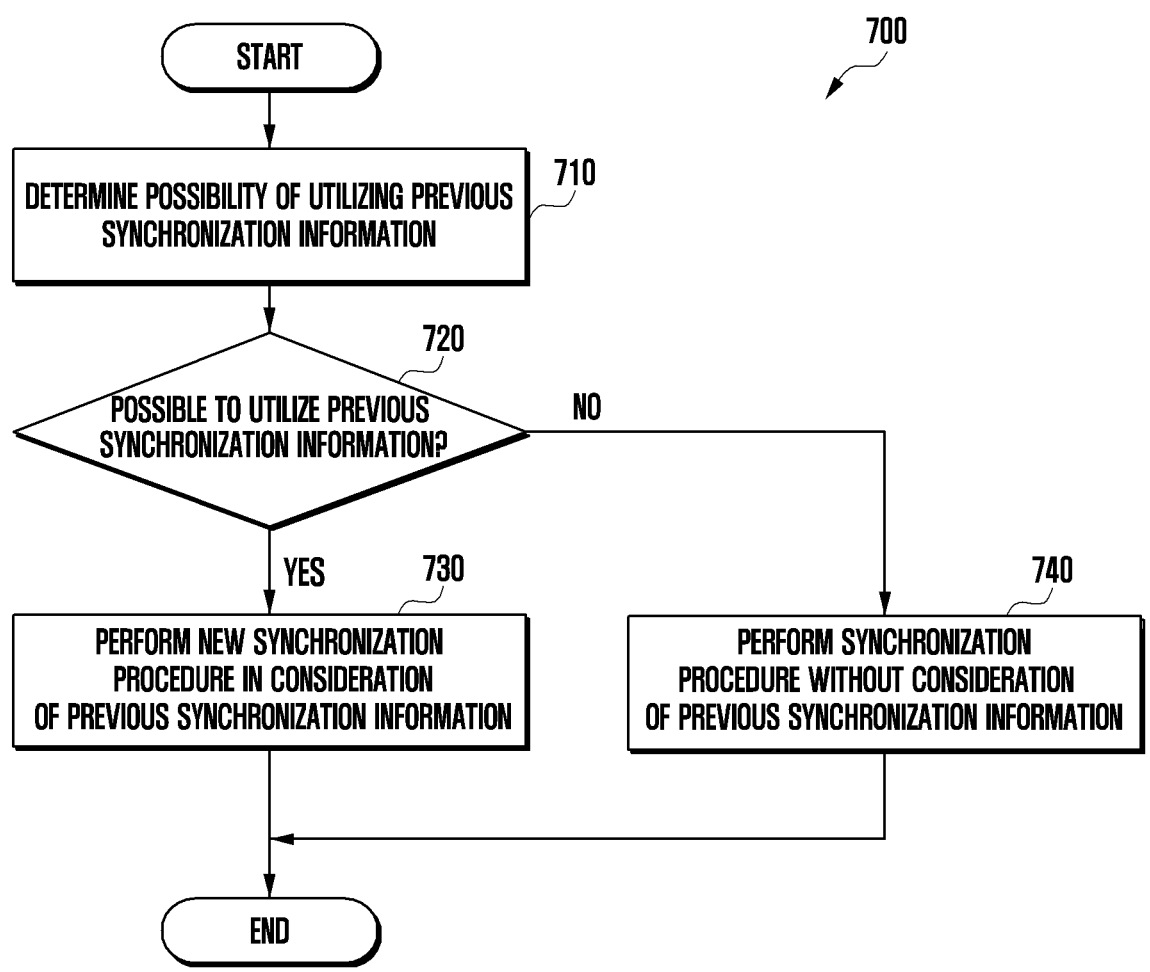
FIG. 7 is a diagram illustrating a synchronization method according to another embodiment of the disclosure.

FIG. 7 is a diagram 700 illustrating a synchronization method according to another embodiment of the disclosure. In FIG. 7, a description is given of an embodiment in which the terminal determines whether to use the previous synchronization information before performing synchronization according to the embodiment described with reference to FIGS. 2 to 6.

According to an embodiment, prior to performing a synchronization procedure using the previous synchronization information, the terminal first determines whether the situation allows the use of the previous synchronization information (710). As described in FIG. 2, because the terminal that have failed in a synchronization procedure using the previous synchronization information has to perform a synchronization procedure again without consideration of the previous synchronization information, the terminal may first determine whether to use the previous synchronization information.

It has been described above that synchronization using the previous synchronization information has a high probability of success when a stationary terminal performs synchronization with the same base station. Hence, to determine whether to use the previous synchronization information, the terminal may consider its mobility while the 5G RF module is turned off. Specifically, upon determining that movement has occurred more than or equal to a preset amount while the 5G RF module is being turned off (i.e., while operating in the low power mode after losing synchronization with the base station), the terminal may determine that the synchronization procedure to be newly performed is not for the same base station. Hence, as the probability that the synchronization procedure using the previous synchronization information is successful is not high, the terminal can perform the synchronization procedure without consideration of the previous synchronization information (720, 740). Here, the terminal may discard the stored previous synchronization information, but may store the previous synchronization information together with information about the corresponding base station.

Even if the 5G RF module is turned off, the terminal can continue to communicate with another communication system by using a different RF module. Accordingly, the terminal may determine not to use the previous synchronization information if a handover with an LTE base station has occurred while the 5G RF module is being turned off, for example. In a such embodiment, the terminal can determine whether movement has occurred by using the cell ID of the LTE base station, and if a cell ID different from the cell ID stored before turning off the 5G RF module is detected, the terminal may determine that movement has occurred and may determine not to use the previous synchronization information. In addition, the terminal can determine whether movement has occurred by using the vendor ID of the LTE base station, and if a vendor ID different from the vendor ID stored before turning off the 5G RF module is detected, the terminal may determine that movement has occurred and may determine not to use the previous synchronization information. For another example, the terminal may directly determine its mobility by using a sensor or module capable of measuring location information and movement information, such as a GPS sensor, a gyroscope sensor, and an acceleration sensor.

Conversely, upon determining that the mobility measured while the 5G RF module is being turned off is less than a threshold, the terminal may determine that the newly synchronization procedure will be performed on the same base station as the base station before turning off the 5G RF module. In this case, the terminal may perform a new synchronization procedure by using the previous synchronization information (720, 730). For example, the terminal may also be notified from the connected LTE base station whether the base station for which synchronization is newly performed is the same as the base station before synchronization is lost.

Figure 8:
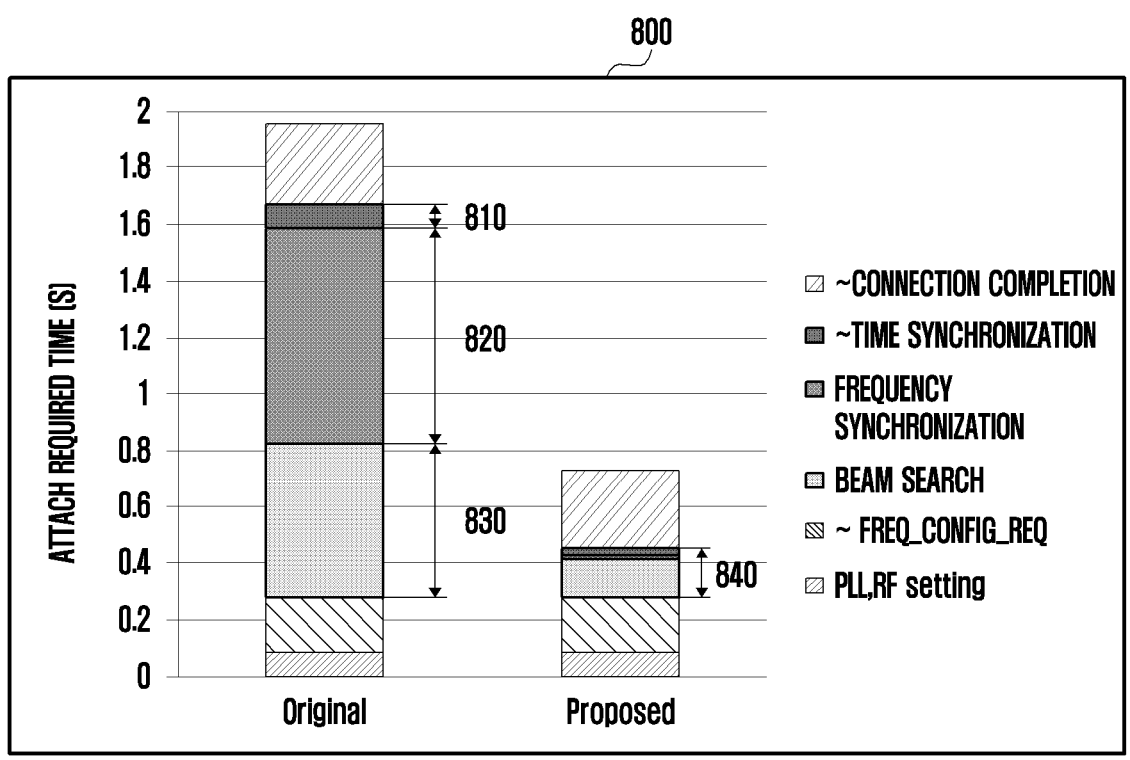
FIG. 8 is a diagram for comparing the time required for the synchronization method according to an embodiment of the disclosure with that for a general synchronization method.

FIG. 8 is a diagram 800 for comparing the time required for the synchronization method according to an embodiment of the disclosure with that for a general synchronization method. FIG. 8 shows a result of comparison between the time required to acquire synchronization according to the general synchronization procedure and the time required to acquire synchronization according to the proposed embodiment.

According to the general synchronization procedure, it takes about 2 seconds for the terminal to obtain synchronization, and not only the time required for time synchronization (810) but also the time required for beam selection and the time required for frequency synchronization account for a large proportion in particular (820, 830).

On the other hand, it can be seen that when the terminal performs synchronization by using the previous synchronization information according to the proposed embodiment, the time for obtaining synchronization is reduced by more than half. In particular, except for the time required for RF module setup and connection completion, the actual time required for beam search, frequency synchronization acquisition, and time synchronization acquisition is reduced to be about ⅕ by utilizing the previous synchronization information (840).

By performing the synchronization procedure using the previous synchronization information according to the proposed embodiment as described above, the terminal can reduce the time required for overall synchronization and effectively reduce the total time for returning from the low power mode. Hence, according to the proposed embodiment, the terminal can efficiently operate the low power mode to thereby reduce battery consumption.

Figure 9:
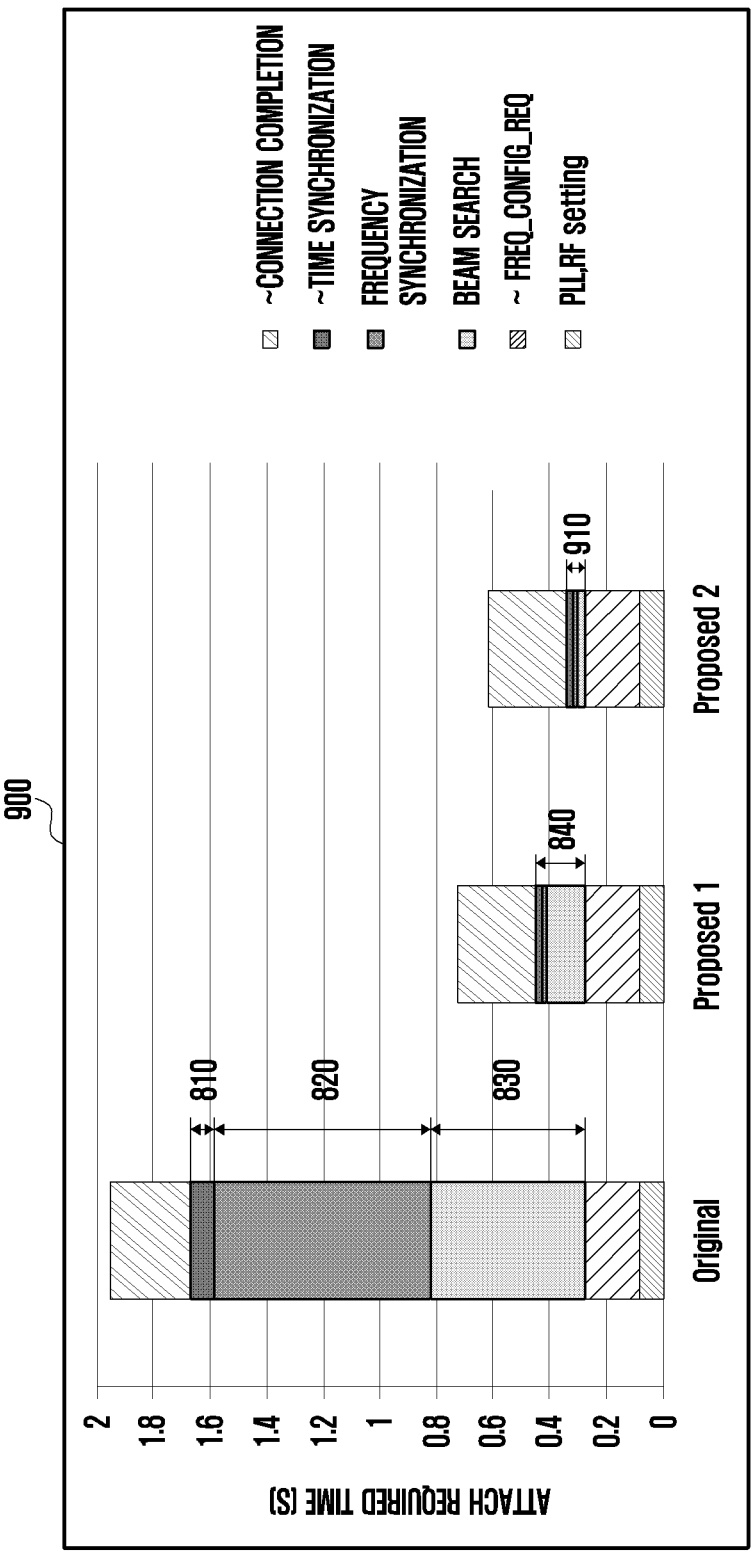
FIG. 9 is a diagram for comparing the time required for the synchronization method according to another embodiment of the disclosure with that for a general synchronization method.

FIG. 9 is a diagram 900 for comparing the time required for the synchronization method according to another embodiment of the disclosure with that for a general synchronization method. The first proposed method in FIG. 9 is the same as that described in FIG. 8, and a detailed description thereof will be omitted. Meanwhile, the second proposed method in FIG. 9 indicates a method in which the terminal performs a synchronization procedure by utilizing the last used beam as the reception beam according to the embodiment described in FIG. 3. That is, when the terminal preferentially selects the last used beam as the reception beam to perform a new synchronization procedure, the terminal can further reduce the time required to sweep reception beams for the beam selection process. Hence, the time for beam search can be further reduced in comparison to the first proposed method described in FIG. 8 (910).

Figure 10:
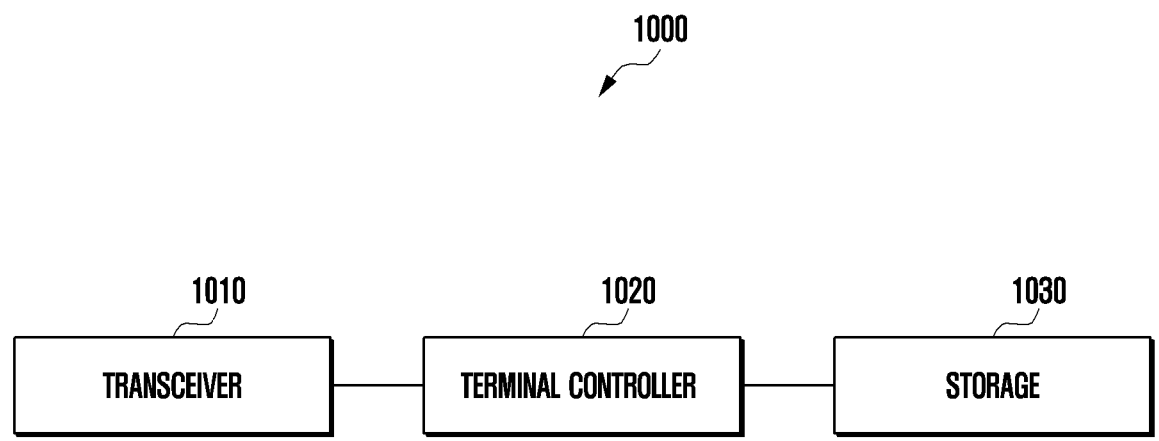
FIG. 10 is a diagram showing the structure of a terminal according to an embodiment of the disclosure.

FIG. 10 is a diagram 1000 showing the structure of a terminal according to an embodiment of the disclosure. With reference to FIG. 10, the terminal may include a transceiver 1010, a terminal controller 1020, and a storage 1030. In the disclosure, the terminal controller 1020 may be defined as a circuit, an application-specific integrated circuit, or at least one processor.

The transceiver 1010 transmits and receives signals to and from other network entities. The transceiver 1010 may receive, for example, a synchronization signal from a base station, and the transceiver 1010 may be implemented in the form of an RF unit including a modem.

The terminal controller 1020 may control the overall operation of the terminal according to the embodiment proposed in the disclosure. For example, the terminal controller 1020 may control the transceiver 1010 and the storage 1030 to perform operations according to the embodiments described in the previous drawings. Specifically, the terminal controller 1020 may perform synchronization by using various types of information for performing a synchronization procedure.

The storage 1030 may store at least one of information transmitted and received through the transceiver 1010 or information generated through the terminal controller 1020.

Figure 11:
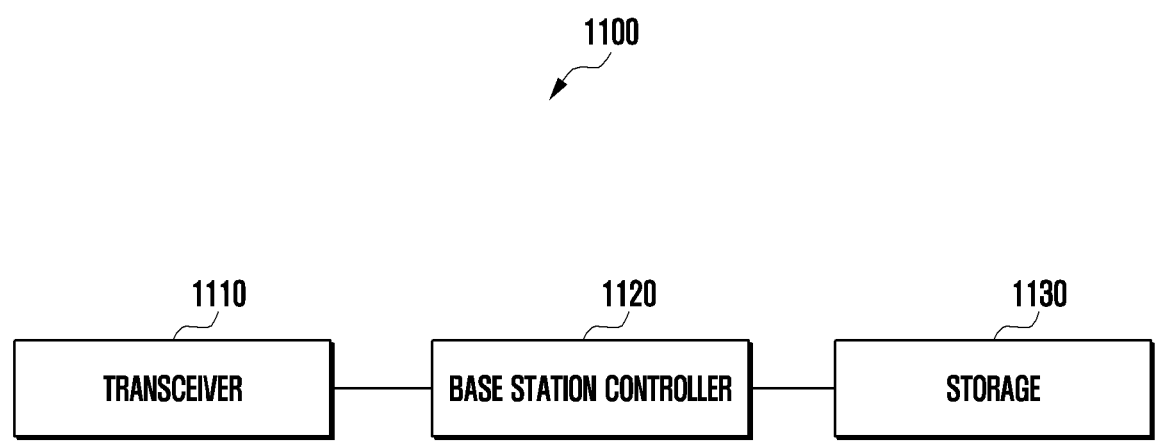
FIG. 11 is a diagram showing the structure of a base station according to an embodiment of the disclosure.

FIG. 11 is a diagram 1100 showing the structure of a base station according to an embodiment of the disclosure. FIG. 11 is a diagram showing the structure of a base station according to an embodiment of the disclosure. With reference to FIG. 11, the base station may include a transceiver 1110, a base station controller 1120, and a storage 1130. In the disclosure, the base station controller 1120 may be defined as a circuit, an application-specific integrated circuit, or at least one processor.

The transceiver 1110 may transmit and receive signals to and from other network entities. The transceiver 1110 may transmit, for example, a synchronization signal to a terminal, and the transceiver 1110 may be implemented in the form of an RF unit including a modem.

The base station controller 1120 may control the overall operation of the base station according to the embodiment proposed in the disclosure. For example, the base station controller 1120 may control the transceiver 1110 and the storage 1130 to perform operations according to the embodiments described in the previous drawings.

Specifically, the base station controller 1120 may transmit a synchronization signal to a terminal according to a preset period or interval.

The storage 1030 may store at least one of information transmitted and received through the transceiver 1110 or information generated through the base station controller 1120.

According to the above-described embodiments, the terminal may perform a simplified synchronization procedure by storing previous synchronization information (beam-related information, frequency synchronization-related information, time synchronization-related information) and utilizing it for a new synchronization procedure. Through the simplified synchronization procedure, the synchronization acquisition process can be rapidly performed, and the time and power consumption required for the synchronization procedure of the terminal can be reduced, so that the burden for driving the 5G module in the low power mode can be reduced.

Meanwhile, preferred embodiments of the disclosure have been disclosed in the specification and drawings, and although specific terms have been used, they are used in a general sense to easily describe the technical details of the disclosure and to help understanding of the disclosure but are not intended to limit the scope of the disclosure. It should be apparent to those skilled in the art that many variations and modifications of the basic inventive concept described herein will still fall within the spirit and scope of the disclosure.

The invention claimed is:

1. A method for a terminal to perform synchronization in a communication system to which beamforming is applied, the method comprising:

identifying, by the terminal, previous synchronization information; and performing synchronization with a base station by using the previous synchronization information, wherein the previous synchronization information is information related to at least one of frequency synchronization acquisition, time synchronization acquisition, or beam search, and wherein the previous synchronization information is information about synchronization that is lost when the terminal turns off a radio frequency (RF) module to enter a low power mode.

2. The method of claim 1, wherein the information related to frequency synchronization acquisition in the previous synchronization information includes information about a position on a frequency axis of a synchronization signal received through the lost synchronization, information about a subcarrier spacing, and information about a value compensating for a carrier frequency error, and wherein the performing of the synchronization comprises obtaining frequency synchronization with the base station by applying the information about the position, the information about the subcarrier spacing, and the value.

3. The method of claim 1, wherein the information related to time synchronization acquisition in the previous synchronization information includes information about a length of a time interval measured by a different RF module, information about a period in which a synchronization signal is transmitted, and information about a time offset for the lost synchronization, and wherein the performing of the synchronization comprises obtaining time synchronization with the base station by identifying a boundary of a time interval from the information about the length of the time interval, the information about the period, and the information about the time offset.

4. The method of claim 1, wherein the information related to beam search in the previous synchronization information includes information about a beam transmission period of a base station and information about a reception beam last used by the terminal, or includes information about a synchronization block transmission period of a base station and a synchronization block transmission frequency position; and wherein the performing of the synchronization comprises performing synchronization with the base station by using the last used reception beam while changing reception beams of the terminal for each beam transmission period, or is performing synchronization with the base station by monitoring the synchronization block transmission frequency position while changing reception beams of the terminal for each synchronization block transmission period.

5. The method of claim 1, wherein, in synchronization using the previous synchronization information, monitoring of a synchronization signal based on at least one of time resources, frequency resources, or reception beams is omitted according to the previous synchronization information, and wherein a base station to which the previous synchronization information is related is identical to a base station with which the synchronization is performed.

6. The method of claim 1, further comprising:

determining whether to use the previous synchronization information while performing synchronization, wherein the synchronization is performed based on the previous synchronization information in case of being determined to use the previous synchronization information, wherein the synchronization is performed without consideration of the previous synchronization information in case of being determined not to use the previous synchronization information, wherein determining whether to use the previous synchronization information is performed based on a mobility of the terminal while operating in the low power mode, wherein, in case that the mobility of the terminal is lower than a threshold, it is determined to use the previous synchronization information, and wherein, in case that the synchronization performed using the previous synchronization information fails, the terminal performs synchronization again without consideration of the previous synchronization information.

7. A terminal performing synchronization in a communication system to which beamforming is applied, the terminal comprising:

a transceiver to transmit and receive signals; and a controller coupled with the transceiver and configured to:

identify, by the terminal, previous synchronization information, and perform synchronization with a base station by using the previous synchronization information, wherein the previous synchronization information is information related to at least one of frequency synchronization acquisition, time synchronization acquisition, or beam search, and wherein the previous synchronization information is information about synchronization that is lost when the terminal turns off a radio frequency (RF) module to enter a low power mode.

8. The terminal of claim 7, wherein the information related to frequency synchronization acquisition in the previous synchronization information includes information about a position on a frequency axis of a synchronization signal received through the lost synchronization, information about a subcarrier spacing, and information about a value compensating for a carrier frequency error, and wherein the controller is configured to obtain frequency synchronization with the base station by applying the information about the position, the information about the subcarrier spacing, and the value.

9. The terminal of claim 8, wherein the information related to time synchronization acquisition in the previous synchronization information includes information about a length of a time interval measured by a different RF module, information about a period in which a synchronization signal is transmitted, and information about a time offset for the lost synchronization, and wherein the controller is configured to obtain time synchronization with the base station by identifying a boundary of a time interval from the information about the length of the time interval, the information about the period, and the information about the time offset.

10. The terminal of claim 7,
wherein the information related to beam search in the previous synchronization information includes information about a beam transmission period of a base station and information about a reception beam last used by the terminal, and
wherein the controller is configured to perform synchronization with the base station by using the last used reception beam while changing reception beams of the terminal for each beam transmission period.

11. The terminal of claim 7,
wherein the information related to beam search in the previous synchronization information includes information about a synchronization block transmission period of a base station and a synchronization block transmission frequency position, and
wherein the controller is configured to perform synchronization with the base station by monitoring the synchronization block transmission frequency position while changing reception beams of the terminal for each synchronization block transmission period.

12. The terminal of claim 7,
wherein, in synchronization using the previous synchronization information, monitoring of a synchronization signal based on at least one of time resources, frequency resources, or reception beams is omitted according to the previous synchronization information, and
wherein a base station to which the previous synchronization information is related is identical to a base station with which the synchronization is performed.

13. The terminal of claim 7,
wherein the controller is configured to determine whether to use the previous synchronization information while performing synchronization,
wherein the synchronization is performed based on the previous synchronization information in case of being determined to use the previous synchronization information, and the synchronization is performed without consideration of the previous synchronization information in case of being determined not to use the previous synchronization information,
wherein the controller is configured to determine whether to use the previous synchronization information based on a mobility of the terminal while operating in the low power mode,
wherein, in case that the mobility of the terminal is lower than a threshold, it is determined to use the previous synchronization information, and
wherein, in case that the synchronization performed using the previous synchronization information fails, the controller is configured to perform synchronization again without consideration of the previous synchronization information.

* * * * *